United States Patent

Boeyé

(10) Patent No.: US 6,405,759 B1
(45) Date of Patent: Jun. 18, 2002

(54) APPARATUS FOR THE CONTINUOUS PREPARATION OF GLASS FIBER SIZING COMPOSITIONS

(75) Inventor: Isabelle Boeyé, Jette (BE)

(73) Assignee: Owens Corning Composites SPRL, Brussels (BE)

( * ) Notice: Subject to any disclaimer, the term of this patent is extended or adjusted under 35 U.S.C. 154(b) by 440 days.

(21) Appl. No.: 08/906,586

(22) Filed: Aug. 5, 1997

(51) Int. Cl.⁷ .................................................. F17D 1/00
(52) U.S. Cl. ........................................ 137/893; 137/897
(58) Field of Search ............................ 137/889, 181.21, 137/896, 897, 893

(56) References Cited

U.S. PATENT DOCUMENTS

| | | | |
|---|---|---|---|
| 2,934,448 A | * 4/1960 | Patton ..................... | 137/896 X |
| 3,334,657 A | * 8/1967 | Smith et al. ............ | 137/889 X |
| 3,704,006 A | 11/1972 | Grout et al. | |
| 3,826,279 A | * 7/1974 | Vershuur .................. | 137/13 X |
| 3,861,652 A | 1/1975 | Clark et al. | |
| 3,875,060 A | 4/1975 | Noma | |
| 3,900,043 A | * 8/1975 | Bowen et al. ......... | 137/101.21 |
| 4,109,318 A | 8/1978 | Hutchings | |
| 4,637,956 A | 1/1987 | Das et al. | |
| 4,722,363 A | * 2/1988 | Allyn ....................... | 137/13 X |
| 4,867,775 A | 9/1989 | Cain et al. | |
| 5,165,440 A | * 11/1992 | Johnston ..................... | 137/13 |
| 5,252,202 A | 10/1993 | Hirose | |
| 5,494,112 A | * 2/1996 | Arvidson et al. ... | 137/101.21 X |
| 5,678,593 A | * 10/1997 | Lockhart ................. | 137/889 X |
| 5,766,357 A | 6/1998 | Packer et al. | |

FOREIGN PATENT DOCUMENTS

| | | | |
|---|---|---|---|
| EP | 472491 A1 | 2/1992 | |
| EP | 740007 A2 | 10/1996 | |
| GB | 756590 | * 9/1956 | ................. 137/897 |
| JP | 56069238 | 6/1981 | |
| WO | WO9520549 A | 8/1995 | |

* cited by examiner

Primary Examiner—Henry C. Yuen
Assistant Examiner—John Bastianelli
(74) Attorney, Agent, or Firm—Inger H. Eckert; James J. Dottavio; Stephen W. Barns

(57) ABSTRACT

An in-line mixing apparatus for the substantially continuous production of size to be supplied to a glass fiber forming process. The in-line mixing apparatus comprises a plurality of stages wherein the first stage is a static mixing device in which sizing components are carefully metered into a flow of water or other carrier fluid, and blended together. A second stage, hydrolyzer, connected to the first stage, provides a chamber in which the blended water and size materials are allowed to chemically react as they move therethrough. A second static mixing device may be connected to the output of the hydrolyzer if additional components need to be added, or if additional mixing of the materials blended in the first stage and reacted in the second stage is necessary. The output of the in-line mixing device may be piped directly to the size applicators of the respective fiber producing operations.

8 Claims, 2 Drawing Sheets

APPARATUS FOR THE CONTINUOUS PREPARATION OF GLASS FIBER SIZING COMPOSITIONS

TECHNICAL FIELD AND INDUSTRIAL APPLICABILITY OF THE INVENTION

This invention relates to an apparatus for preparing or constituting sizing compositions (hereinafter "size") used in the manufacture of glass fibers on site just prior to their use. More specifically, an in-line mixing apparatus has been developed to mix the raw materials needed for a particular size with a carrier fluid, such as water, and deliver the newly constituted size to an applicator for application to the glass fibers on a substantially continuous basis.

BACKGROUND OF THE INVENTION

In the manufacture of glass fibers, molten streams of fiberizable glass material are typically pulled through a bushing or ejected from a spinner and attenuated into fibers. Shortly after the fibers are attenuated, they are often coated with a size to retard interfilament abrasion and improve the handleability of the fibers, as well as to increase the compatibility of the fibers with the environment of their intended use. Typically, such sizes are aqueous solutions or dispersions containing film-forming polymeric materials, organosilane coupling agents, lubricants and various other processing aids, and are applied to the fibers by spraying or by passing the fibers across a pad or roll saturated with the size. However, for each glass end use application, a different size of unique formulation is often needed.

In the past, the production of size has typically been conducted through a batch process whereby the sizes are prepared off-line, stored and then used/applied as needed. Since the size needed for different glass fiber applications can be quite varied, the simultaneous running of different glass fiber production lines requires that a suitable quantity of various sizes be maintained on site. However, maintaining such an inventory requires substantial capital expense allocations. For example, facilities for the production and storage of size must be designed and constructed. The area must be large enough to house the raw materials, size formulating equipment and storage tanks for the batches of size. Additionally, the stored size must be maintained at proper temperatures to prevent deterioration.

Further, obvious problems can arise during glass fiber processing if an inadequate size inventory is maintained. Underestimating the quantity of size needed may result in costly events ranging from delays to a complete halt in glass fiber production. Moreover, since the sizes generally have a limited shelf life, overestimating the size requirements may lead to waste, as unused size may have to be discarded.

SUMMARY OF THE INVENTION

To alleviate the problems noted above, an in-line mixing apparatus has been developed for formulating the size continuously, as needed, just prior to its use. More specifically, an in-plant facility is provided for the substantially continuous manufacture of sizes immediately prior to their application to glass fibers, by adding the various components of the size together in a mixing apparatus and supplying the mixture to the sizing applicator. The components are chosen in accordance to the particular size required, and are injected into a stream of water or other carrier fluid flowing within the in-line mixing apparatus to constitute the size.

The mixing apparatus generally comprises at least two stages. The first stage providing a mixing device to mix together components used in preparing the size and disperse the mixture throughout the liquid carrier. The resulting mixture exits the first mixing device directly into a hydrolyzer, or second stage, where it resides for a sufficient time to allow the components to chemically react as desired. The mixture may then pass through additional mixing devices or stages if additional components are to be added to the mixture, or if greater residence time is needed to complete the desired chemical reactions between the components. Subsequently, the size may be piped directly to the size application device, or to a reservoir from which the size application device is fed.

DETAILED DESCRIPTION AND PREFERRED EMBODIMENTS OF THE INVENTION

Figure 1:
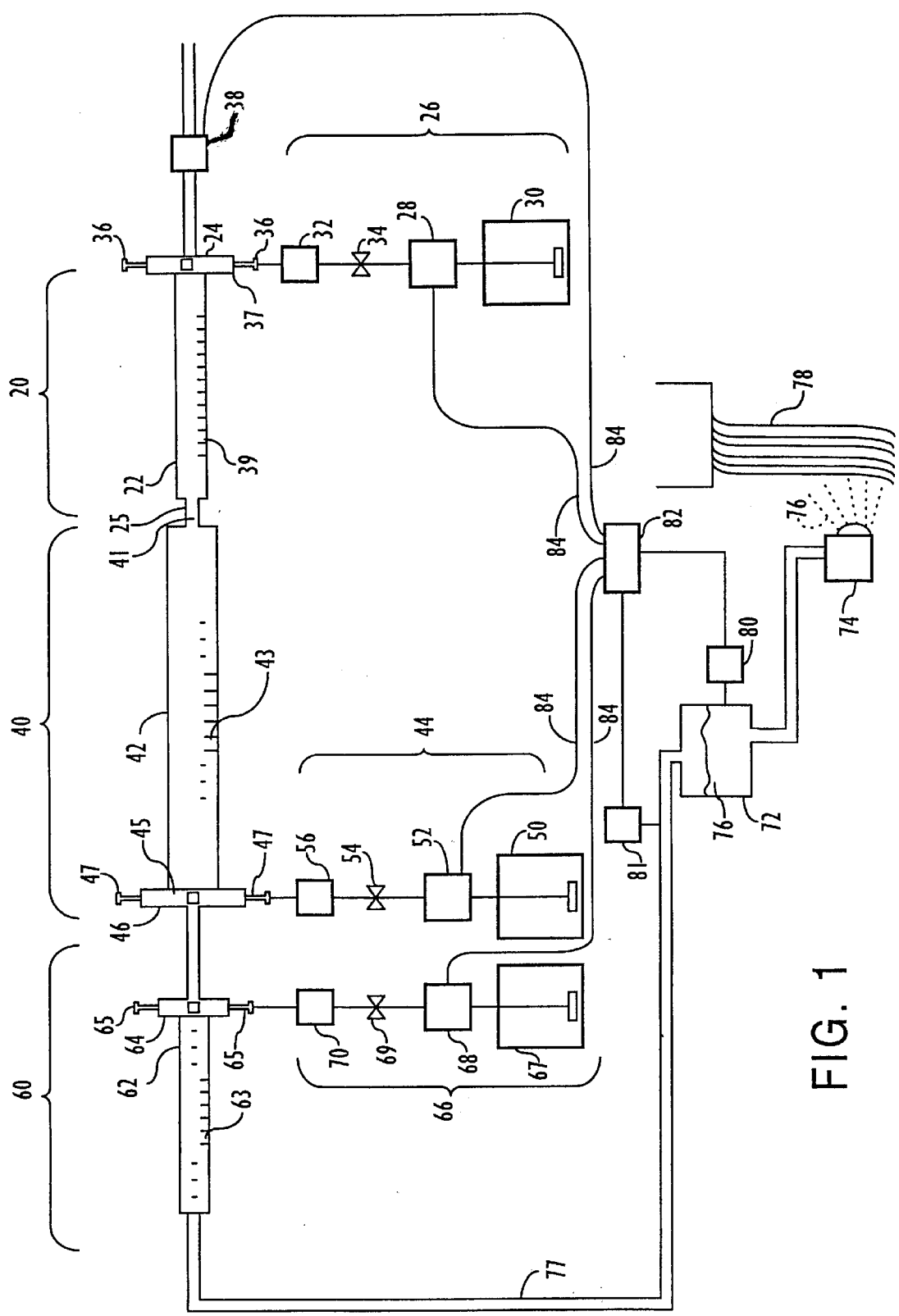
FIG. 1 is a longitudinal cross-sectional view of an embodiment of the in-line mixing apparatus.

The in-line mixing apparatus of the present invention is a multistage mixing device installed in a factory or plant where glass fibers are manufactured. Its purpose is to combine the various size components with a moving carrier fluid to constitute the size on a substantially continuous basis immediately prior to its application to the glass fibers as they are being pulled from a fiber-forming bushing or ejected from a fiber-producing spinner. The mixing apparatus is comprised of, at a minimum, a first static mixing device as a first stage, and a hydrolyzer or hydrolysis reactor as a second stage, wherein the outlet of the first mixing device is connected to the inlet of the hydrolyzer. Preferably, the mixing apparatus has, as a third stage, an additional static mixing device connected to the outlet of the hydrolyzer. However, additional stages, comprising static mixing devices or reactor chambers, may be serially added as necessary to obtain the desired size at the exit of the last stage. As the size exits the mixing apparatus, it is fully constituted and can be directly piped or otherwise delivered from the mixer outlet to the size application device used in the fiber-producing operation or to a reservoir from which the size application is fed.

The static mixing devices are longitudinally tubular chambers of a size adequate to accommodate the quantities of size required. The components necessary for a particular size are added to a carrier fluid (usually water) flowing under pressure within the mixing device in a longitudinal direction. The carrier fluid and size components are combined within the first mixing device and mixed together due to the turbulence generated within the fluid stream as it passes through the device. Additionally, as the size components are mixed, they may begin to chemically react with one another or with the carrier fluid as they flow through the first mixing device. To ensure god mixing of the components, the mixing device is preferably equipped with conventional internal mixing elements installed within the device.

The outlet end of the first mixing device or stage is directly connected to an inlet end of a hydrolyzer or hydrolysis reactor. The hydrolyzer or second stage of the in-line mixing apparatus may be larger in length and diameter than the first mixing device to increase the residence time of the fluid. Additionally, conventional mixing elements may be installed in the hydrolyzer to increase mixing of the components blended in the first stage. Preferably, the hydrolyzer is sized such that the mixture flows through it at a rate that permits the components to fully react prior to exiting the hydrolyzer. Also, the hydrolyzer may be equipped with additional material inlets should it be desired to introduce additional components to the mixture emerging from the first mixing device.

A second mixing device, or third stage, similar to the first mixing device or stage may be attached to the exit of the hydrolyzer to provide additional blending of the components and to increase the residence time of the size as necessary to allow for continued reaction between the components. The third stage may also be equipped with additional material inlets should it be desired to add components to the mixture emerging from the hydrolyzer.

The exit of the last stage of the in-line mixing apparatus, be it the second stage hydrolyzer, the third stage mixing device, or any additional mixing device or reaction chamber, is preferably connected directly to the feed reservoir of the size applicator used in the fiber-forming operation. For example, a direct connection system such as a pipe may be used to connect the output of the in-line mixer to the reservoir vessel of the size applicator.

In use, once the size recipe is selected for a given run of glass fibers, appropriate quantities of the various components of the size are introduced, preferably via dosing pumps and injectors, into the flow of the carrier fluid, usually water, passing through the in-line mixing apparatus. While the injectors can be located anywhere on the mixing apparatus that will result in thorough mixing of a component introduced at that location throughout the composition, it is generally preferred that many of the size components, including any that require time to chemically react or that require longer mixing times to become dispersed throughout the liquid carrier, be introduced to the mixing apparatus at the inlet of the first stage. Accordingly, the mixing apparatus preferably includes an injector ring at the inlet end of the first stage, equipped with injectors extending radially therein substantially perpendicular to the liquid flow. The components introduced into the mixing chamber thereby are blended with the liquid as the mixture is agitated by the turbulence of the liquid stream moving through the mixing device. Moreover, as the mixture passes through the mixing device, the components can begin to chemically react with one another and/or with the carrier liquid. The mixture moves through the mixing device and exits therefrom into the hydrolyzer or second stage.

Preferably, the mixture moves through the hydrolyzer at a slower pace than in the first stage, thus allowing for an extended residence time compared to the residence time in the first mixing device. This allows sufficient time for the components to fully chemically react prior to being applied to the glass fibers. When the mixing apparatus comprises the optional third stage, an additional injector ring is preferably located at the exit end of the hydrolyzer, or at the inlet of the third stage mixing device, such that additional components may be added as the size mixture enters the third stage. In this embodiment, the mixture is then moved through a second mixing device, attached to the hydrolyzer, to allow increased mixing of the components and greater residence time to complete any desired chemical reactions. The completed size is then delivered, in liquid form, to the particular fiber forming operation where it is needed, preferably through an installed plumbing or piping system.

A preferred embodiment of the in-line mixing apparatus of the invention is further described herein by reference to the accompanying drawings. FIG. 1 shows the preferred in-line mixing apparatus of the invention 10, which is constituted by three serially connected stages 20, 40 and 60.

The first stage 20 is a tubular structure comprising a mixing chamber 22 containing mixing elements 39, into which water or other suitable fluid is introduced under pressure at inlet 24, at a controlled rate by an adjustable output pump (e.g. a dosing pump) or other suitable flow regulating device 38. To this stream of liquid, the components of the size are added using a component supply system 26 being shown attached to mixing chamber 22 at injector ring 37. It is to be understood that more than one supply system may be used and connected to the injector ring. To this end, the injector ring is provided with a plurality of injectors 36 to be used as desired.

The supply system (or systems) includes an interconnected component storage vessel 30, an adjustable output pump or other suitable flow regulator 28, and a counter-pressure valve 34. The supply system is connected to an injector 36 on the mixing chamber 22, and the amount of raw materials to be added, determined by the recipe chosen for a particular size, is controlled by pump 28. Flow meter 32, located between valve 34 and injector 36, monitors the output of pump 28 and emits a signal if the output flow is not as desired, which can be used to adjust the pump output to the desired level.

The mixing chamber 22 preferably contains mixing elements 39 to aid in mixing the size components as the mixture passes through the mixing chamber. The outlet 25 of mixing chamber 22 is connected to an inlet 41 of hydrolyzer 42, the second of the three stages of the preferred in-line mixing apparatus. The hydrolyzer 42, like mixing device 22, is of tubular construction. However, it is preferably larger in diameter and in length, for the reasons explained below.

The hydrolyzer tubular chamber 42 is not intended to be primarily a mixing apparatus. Instead, the hydrolyzer chamber 42 is intended to allow a sufficient period of time to permit the size components and fluid to chemically react (e.g., hydrolysis of organosilane coupling agents) prior to delivery of the size to the size applicator or applicator supply reservoir. Therefore, hydrolyzer chamber 42 preferably has a larger interior volume than the first stage mixer to slow the flow rate of the size mixture emerging from the mixing chamber. However, although the main function is to provide sufficient residence time to allow the raw materials of the size to chemically react, the hydrolyzer chamber may contain mixing elements 43 should additional blending be desired, or if necessary to prevent separation.

The hydrolyzer chamber may also be equipped with injectors for adding additional size components, such as injector ring 45 shown installed at the outlet 46 of hydrolyzer chamber 42. A component supply system 44 is shown attached to an injector 47 of injector ring 45. The supply system is similar to the supply system 26 described hereinabove, and comprises an interconnected component storage vessel 50, an adjustable output pump 52, a counter-pressure valve 54 and flow meter 56 connected to the injector 47.

The flow exiting the hydrolyzer is directed into the third stage 60. Third stage 60 includes a mixing chamber 62 similar to the first stage, which includes mixing elements 63 to further blend the size. The mixing chamber 62 may also be equipped with injectors to permit the introduction of additional size components. For example, an injector ring 64 having injectors 65 interconnected to component supply systems 66, comprising storage vessel 67, an adjustable output pump 68, counter-pressure valve 69 and flow meter 70, may be attached to mixing chamber 62. As in the mixing chamber of the first stage, components added to the mixture at injector rings 45 or 64 are blended in the chamber 62 by turbulence imparted to the moving fluid by mixing elements 63.

The mixing process is preferably controlled to continuously supply sufficient quantities of the size to permit continuous operation of the glass fiber producing operation, and to assure that the size supplied to the applicator is of the desired composition. Preferably, the applicator system used to apply the size material to the glass fibers includes a supply tank 72 for the size applicator 74, into which the size 76 is delivered via line 77 from the in-line mixing apparatus. Size 76 is withdrawn from the supply tank 72 and applied to glass fibers 78 by applicator 74. Excess size from the coating operation may be collected and returned to the supply tank for reuse. The size usage rate can be monitored by observing the liquid level in supply tank 72 with a suitable probe or level indicator 80. Additionally, any suitable in-line concentration meter, 81 can be used to monitor the concentration of the various components of the size. The information gathered by such level indicators and concentration meters can be fed to a computer control system 82 for controlling the component dosing pump speeds and the input rate of the liquid into the in-line mixer via control lines 84.

The types, amounts and sequence of component addition are dictated by the recipe for the particular size desired. Typically, the size will contain coupling agents, pH modifiers, lubricants, film formers and stabilizers, many of which can be reactive.

Figure 2:
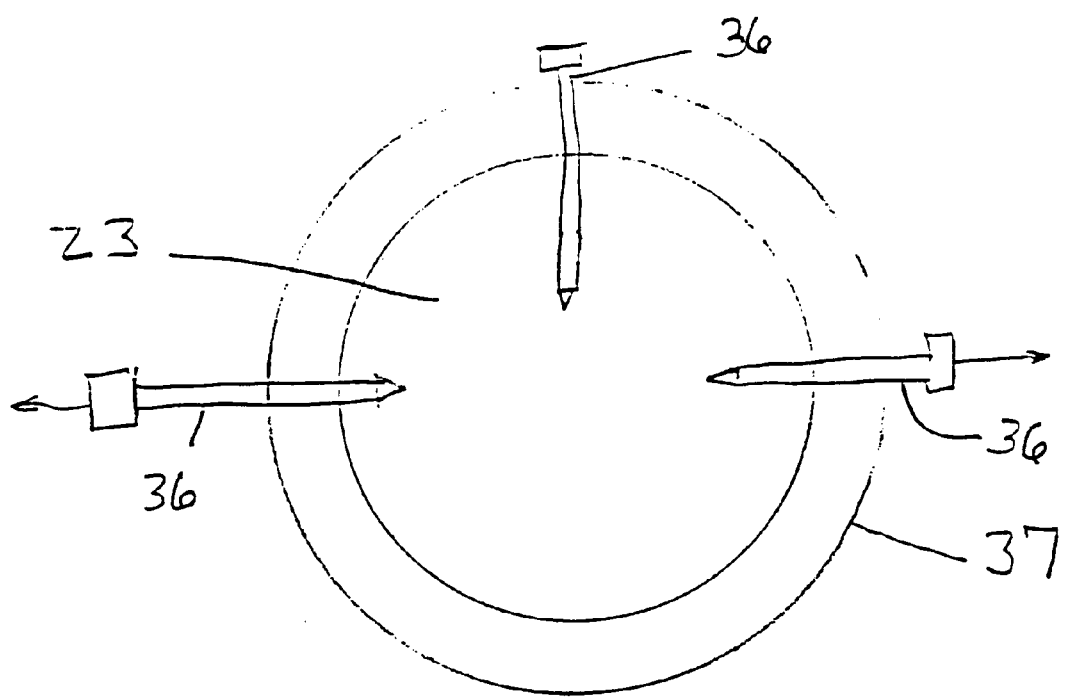
FIG. 2 is a cross-sectional view of the injector rings of the in-line mixer.

FIG. 2 shows the injector ring 37 with three injectors 36 installed therein. It is to be noted that more or less than three injectors may be installed. The injector ring 37 has substantially the same internal diameter as the mixing chamber to which it is attached. Also, it will be noted that the injectors 36 preferably extend into the interior of injector ring 37 so as to extend into the fluid 23 flowing therein. This allows efficient delivery of the size ingredients into the fluid 23. Injector rings 45 and 64 shown in FIG. 1 on the hydrolyzer 42 and the third stage mixer 62, respectively, are preferably constructed like the ring 37.

While FIG. 1 shows only one injector ring (e.g. 37) on each tubular chamber (e.g. 22), it is also possible to install multiple injector rings at plural locations along the longitudinal axis of the various chambers, or to install a single injector ring at locations other than those shown in FIG. 1. Accordingly, if a size component should be added to the mixture only after other components have been added and reacted, that component may be added through an injector mounted downstream from where the previous components were introduced. Also, it is possible to install the injectors onto and through the walls of the mixing and hydrolyzer chambers without the use of an injector ring. Thus, holes could be drilled through the mixing chamber walls and injectors mounted therein to inject materials into the interior of the chamber.

What is claimed is:

1. An in-line mixing apparatus for the substantially continuous preparation of liquid mixtures, comprising at least a first and a second stage serially connected to each other; said first stage comprising a first tubular chamber having an inlet end and an outlet end, means within said first chamber for uniformly mixing materials introduced therein with a carrier fluid flowing therethrough, a means connected to said inlet end of said first chamber for introducing a controlled amount of a carrier fluid into said first chamber, and at least one means connected to said first chamber for separately introducing into said chamber a controlled amount of a component material to be mixed with said carrier fluid; and a flow regulator for regulating the amount of said component material introduced into said chamber; and a second stage comprising a second tubular chamber having an inlet end and an outlet end, wherein said inlet end of said second chamber is in flow communication with said outlet end of said first chamber.

2. The mixing apparatus of claim 1, wherein said means for introducing a controlled amount of a component material to be mixed with said carrier fluid comprises an injector mounted in said first tubular chamber for injecting materials into said chamber, and said flow regulator is connected to said injector for regulating the amount of said component material introduced through said injector.

3. The mixing apparatus of claim 2, wherein said flow regulator comprises an adjustable output pump and flow meter.

4. The mixing apparatus of claim 1, wherein said means for introducing a controlled amount of a component material to be mixed with said carrier fluid comprises at least one injector mounted within a cylindrical ring having an internal diameter substantially the same as said first chamber, said ring being affixed to said first chamber upstream of said outlet end and in flow communication therewith; and a flow regulator connected to said injector for regulating the amount of said component material introduced through said injector.

5. The mixing apparatus of claim 4, wherein said flow regulator comprises an adjustable output pump and flow meter.

6. The mixing apparatus of claim 5, wherein said second tubular chamber is larger in diameter and in length than said first tubular chamber.

7. The mixing apparatus of claim 6, further comprising at least one means for introducing a controlled amount of a component material into said second chamber.

8. The mixing apparatus of claim 5, further comprising a third stage, comprising a third tubular chamber having an inlet end and an outlet end, wherein the inlet end of said third chamber is in flow communication with the outlet end of said second chamber; and means within said third chamber for mixing materials flowing therethrough.

* * * * *